(12) United States Patent
Skidanov et al.

(10) Patent No.: US 10,963,440 B2
(45) Date of Patent: Mar. 30, 2021

(54) FAST INCREMENTAL COLUMN STORE DATA LOADING

(71) Applicant: SingleStore, Inc., San Francisco, CA (US)

(72) Inventors: Alex Skidanov, San Francisco, CA (US); Anders J. Papitto, El Cerrito, CA (US); Adam Prout, San Francisco, CA (US)

(73) Assignee: SingleStore, Inc., San Francisco, CA (US)

( * ) Notice: Subject to any disclaimer, the term of this patent is extended or adjusted under 35 U.S.C. 154(b) by 901 days.

(21) Appl. No.: 15/149,155

(22) Filed: May 8, 2016

(65) Prior Publication Data

US 2017/0046394 A1 Feb. 16, 2017

Related U.S. Application Data

(60) Provisional application No. 62/203,377, filed on Aug. 10, 2015.

(51) Int. Cl.
  *G06F 16/22* (2019.01)
  *G06F 16/23* (2019.01)

(52) U.S. Cl.
  CPC ........ *G06F 16/221* (2019.01); *G06F 16/2379* (2019.01)

(58) Field of Classification Search
  None
  See application file for complete search history.

(56) References Cited

U.S. PATENT DOCUMENTS

| | | | | |
|---|---|---|---|---|
| 6,578,039 B1* | 6/2003 | Kawamura | ......... | G06F 16/2282 |
| 9,218,382 B1* | 12/2015 | Muntes | .................... | G06F 17/40 |
| 2009/0313418 A1* | 12/2009 | Ross | ................... | G06F 12/0246 711/103 |
| 2011/0219020 A1* | 9/2011 | Oks | ........................ | G06F 16/221 707/769 |
| 2013/0159248 A1* | 6/2013 | Mueller | .............. | G06F 16/2453 707/609 |
| 2015/0006509 A1* | 1/2015 | Shao | ................... | G06F 16/2453 707/719 |
| 2015/0363440 A1* | 12/2015 | Alvey | ................... | G06F 16/221 707/769 |

* cited by examiner

*Primary Examiner* — Aleksandr Kerzhner
*Assistant Examiner* — Eddy Cheung
(74) *Attorney, Agent, or Firm* — EIP US LLP

(57) ABSTRACT

A database is partitioned into a plurality of sorted runs, wherein each sorted run includes a set of sorted segments of data records. One of the sorted runs preferably includes more than half of the records of the database, and the other sorted runs are progressively smaller. A query is processed by searching each of the sorted runs. Writes are effected by appending a new sorted run to the database. Sorted merges are used to combine the smaller sorted runs. Deletions are effected by marking the deleted record in the sorted run. Modifications are effected by deleting the original record and writing the modified record to the database. The larger sorted runs are only re-sorted or merged when the sorted run includes a substantial number of deletions. Two merge queues are maintained to enable rapid merges of the smaller sorted runs while a merger of larger sorted runs are occurring.

20 Claims, 5 Drawing Sheets

| EmpID | LastName | First Name | Gen | Age | Hrl213 $ |
|---|---|---|---|---|---|
| 1423 | Smith | Mar213 | f | 31 | 19.80 |
| 0821 | Jones | Scott | m | 19 | 12.75 |
| 0622 | Murph213 | Harold | m | 43 | 25.40 |
| 2356 | Bro211n | Ruth | f | 35 | 15.25 |
FIG. 1A
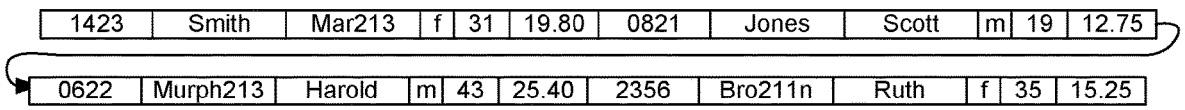
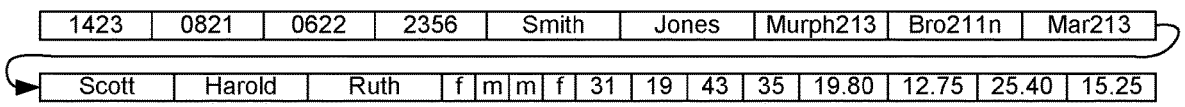
FIG. 1B
FIG. 1C
[PRIOR ART]
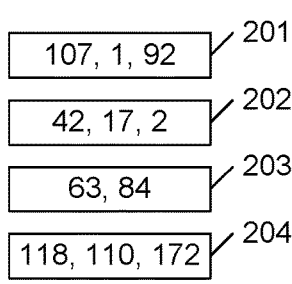
FIG. 2A
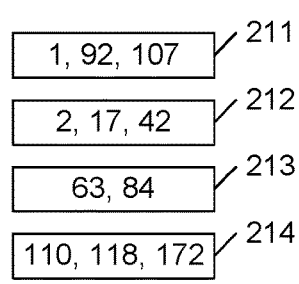
FIG. 2B
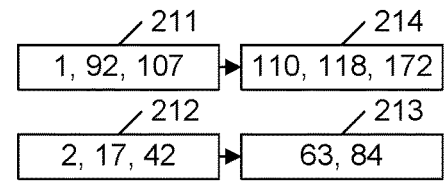
FIG. 2C
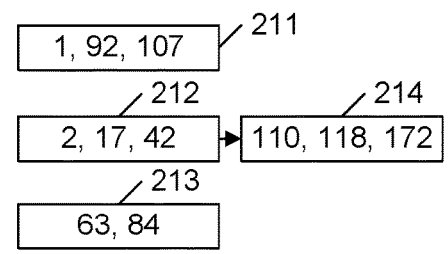
FIG. 2D
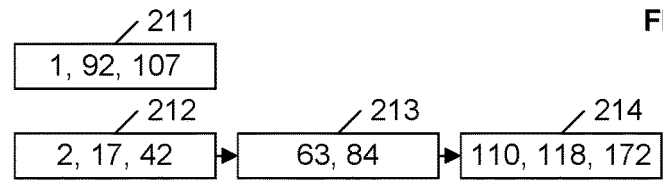
FIG. 2E

FAST INCREMENTAL COLUMN STORE DATA LOADING

This application claims the benefit of U.S. Provisional Patent Application 62/203,377, filed 10 Aug. 2015.

BACKGROUND AND SUMMARY OF THE INVENTION

This invention relates to the field of database query systems, and in particular to a column store method, system, and architecture that facilitates low latency queries and incremental on-line data ingestion.

A database typically comprises a multi-dimensional arrangement of data items, such as a two-dimensional array comprising rows and columns. Each row of data values is commonly referred to as a 'data record', or merely 'record', and each column of data values is commonly referred to as a 'data field', or 'attribute'. That is, a record comprises a value corresponding to each attribute (where the value may be 'nul').

In reality, the data items are stored sequentially in a memory, and may be stored with each record following each other (row store) in memory, or with all of the values of an attribute following each other (column store) in memory. For ease of reference herein, the term 'memory' includes any form of storage, including discs and solid-state storage devices.

FIG. 1A illustrates a visualization of a matrix of information, such as might be found in a database of employees. In this example, the 'attributes' of each record are an employee identifier (EmpID), the employee's name (LName, FName), gender (Gen), age (Age), and hourly wage (Hrly$). FIG. 1B illustrates this information being stored in a row store memory structure wherein the value of each attribute of each record is stored sequentially. FIG. 1C illustrates this same information being stored in a column store memory structure, wherein all of the values of each attribute are stored sequentially.

Because read and write memory operations facilitate the entry or retrieval of a sequence of data values, row store facilitates the entry, deletion, and retrieval of records, but is inefficient for operations such as searches. A search for records that have a particular value, or range of values of a given attribute requires either a read of the entire record, from which the attribute value is extracted, or an individual read of each attribute value, spaced apart by the length of the record.

Column store, on the other hand is very efficient for search operations, but inefficient when a record needs to be added, deleted, or retrieved. A search for records that have a particular value, or range of values of a given attribute can be performed by sequentially reading the attribute values. This efficiency is further enhanced if the values in the given attribute are sorted. Retrieving the corresponding record, however, requires an individual read of each attribute value of the record, spaced apart by the distance between each attribute value of the record. Column store is particularly well suited for applications such as statistic and demographic analyses, financial services, fraud detection, and other real-time analytics applications.

Column store also enables a variety of data compressing techniques. For example, because the range of values of an attribute may be limited (e.g. gender: male or female; age: 0 to 120; and so on), techniques such as run-length encoding, dictionary encoding, and so on can provide substantial memory savings. The compression efficiency is further improved if the values of the attribute is sorted, or if the data includes many null values (sparse matrix).

As noted above, sorted attribute values improve the search efficiency of a column store. However, to maintain the sorted order, each newly added record needs to be inserted in the proper order, and each change of the attribute value of a record may necessitate a re-sort of the database. In a system comprising millions of records, such a re-sort with every insertion would introduce an unacceptable delay, particularly if the database is locked during the re-sort. In many embodiments, modifications and additions are performed in cache, then the cache is batch-loaded into the database as required.

In a large database, updates to the database may include thousands of changes or additions. Maintaining a sorted column store as the data is ingested presents a major challenge, and most large column store databases do not support sorted column stores. Consequently, searches of these databases consume a substantial amount of time. Alternatively, to provide efficient searches, the database may be sorted after the data is ingested. Such a batch-sort approach will generally require taking the database 'off-line' for the duration of the sort and introduces substantial delays when on-line changes are made that introduce a change in the sort order.

It would be advantageous to provide a database structure that provides the search efficiency of sorted column stores while also providing an efficient technique for data ingestion and on-line changes.

These advantages, and others, can be realized by partitioning the database into a plurality of sorted runs, wherein each sorted run includes segments of data that are sorted internally (within segments) and externally (between segments). Preferably, one of the sorted runs includes more than half of the records of the database, and the other sorted runs are progressively smaller.

A query is processed by searching each of the sorted runs for a target search value, but because the search attribute of each sorted run is sorted, this search is substantially faster than a search through unsorted attributes.

Writes to the database are effected by appending a new sorted run to the database. To control the number of sorted runs in the database, sorted merges are used to combine the smaller sorted runs.

Deletions from the database are effected by marking the deleted record.

Modifications to a record in the database are effected by deleting the original record and writing the modified record to the database.

The larger sorted runs are only re-sorted or merged when a substantial number of records within the sorted run are marked as deleted, or when the database grows substantially.

Two merge queues are maintained to enable rapid merges of the smaller sorted runs while a merger of larger sorted runs is occurring.

BRIEF DESCRIPTION OF THE DRAWINGS

The invention is explained in further detail, and by way of example, with reference to the accompanying drawings wherein:

FIGS. 1A-1C illustrate an example set of data stored in row order ('row store') and stored in column order ('column store');

FIGS. 2A-2E illustrate an example set of segments and possible sets of sorted runs of these segments;

Throughout the drawings, the same reference numerals indicate similar or corresponding features or functions. The drawings are included for illustrative purposes and are not intended to limit the scope of the invention.

DETAILED DESCRIPTION

Figure 3:
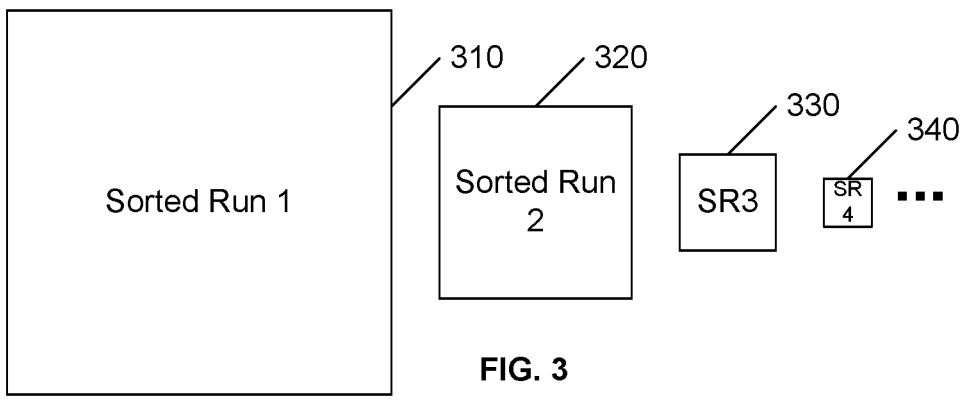
FIG. 3 illustrates an example set of sorted runs with progressively smaller sizes.

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

There are many techniques that may be used to optimize data storage, search efficiency, record retrieval, and other characteristics of a database management system. These techniques typically employ the use of pointers and/or indexes to reference the records in the database. In most cases, these techniques are transparent to the user. For the purposes of this disclosure, the paradigm of a 'fully exploded' data store is used, wherein each attribute value of each record, rather than a pointer to the value or the record, is assumed to be present in the memory, such as illustrated in FIG. 1C.

A commonly used technique for use with a column store database is the creation of 'projections' on the database. A projection identifies a set of attributes that are likely to be accessed together, one of these attributes being the search attribute, or 'key' for this projection. The number of projections that are defined are only limited by the storage required to store each projection.

Using the example set of data in FIGS. 1A-1C, a projection may be: (EmpID, Hrly$|EmpID), which identifies the tuple EmpID, Hrly$ as a commonly accessed pair of attributes, sorted by EmpID). In this example, the attribute following the vertical bar "|" is the search attribute (key); if a key is not expressly defined, the first attribute is the key by default. Other projections might include: (LName, FName, Gen), (EmpID, LName, FName|LName), and so on.

With a plurality of projections, there will be a plurality of keys that may be used to find the record(s) that match a target value, or range of target values. For example, a search for an employee's first and last name and employee identifier based on the employee's last name would use the (EmpID, LName, FName|LName) projection. For ease of presentation and understanding, this invention is presented herein using the paradigm of a projection of the entire set of attributes and a single search attribute (a single key). One of skill in the art will recognize that the principles presented herein are applicable to any defined projection.

Conventionally, memory elements are partitioned into 'segments', which are commonly blocks of memory of uniform size. This partitioning is generally related to hardware characteristics, such as the range of the number that is used to access memory (e.g. 64K), or a multiple of the number of bytes that are provided with each disc read. In the context of this invention, the database is assumed to be stored in a plurality of segments. A large database may contain millions of segments, each segment containing thousands of bytes.

FIGS. 2A-2E illustrate some basic concepts used in this disclosure. FIG. 2A illustrates four example segments of memory containing key values. As noted above, the segments may contain thousands of attribute values, and not just the two or three keys illustrated in these figures.

The segments of FIG. 2A are not sorted with respect to the key values (hereinafter 'key' values). The segments of FIG. 2B are sorted with respect to the key values. That is, for example, the key values in the first segment are stored in memory as 107, 1, 92, in non-sequential order in FIG. 2A, and in memory as 1, 92, 103 in sequential order in FIG. 2B. Obviously, this rearrangement of the key values includes a corresponding rearrangement of each of the other attribute values in the record (that is, the records are logically ordered with respect to their key values). The segments of FIG. 2B are said to be 'internally' sorted, and will support highly efficient search techniques for target values of a sorted key, common in the art.

It would be desirable to have segments that are 'externally' sorted as well, so that these same highly efficient search techniques can be applied to groups of segments that are arranged in order of the key value (hereinafter 'sorted runs'). Note that each segment may be characterized by its range, as defined by its minimum and maximum key values. For example, segment 211 has a range [1:107]; segment 212 has a range [2:42]; segment 213 has a range [63:84]; and segment 214 has a range [110:172]. The range of each segment may be stored as metadata associated with each segment, to avoid having to repeatedly read the first and last value of each segment, as detailed below.

A sorted run may not contain segments that overlap, because the sort order of the key values within the overlapped regions is not defined. Stated alternatively, the minimum value (metadata) of the 'next' segment in a sorted run must be greater than or equal to the maximum value (metadata) of the prior segment; this ensures that the combination of these two segments do not overlap and are externally sorted. A sorted run may comprise a single sorted segment.

FIGS. 2C-2E show a variety of sorted runs that can be formed from the four sorted segments 211-214. In FIG. 2C, the minimum value (110) of segment 214 is larger than the maximum value (107) of segment 211, and thus the combination of segments 211 and 214 results in a sorted arrangement of the key values (1, 92, 107, 110, 118, 172). In like manner, the combination of the remaining segments 212 and 213 results in the sorted arrangement of key values (2, 17, 42, 63, 84). In like manner, the three sorted runs of FIG. 2D and two sorted runs of FIG. 2E provide a sorted arrangement of key values.

A search of the database for a target key value can be effected by searching each sorted run. As noted above, because the segments of each sorted run are internally and externally sorted with respect to the key, these searches will be very efficient. A search for a particular target value will generally only require searching one segment: the segment whose range (metadata) includes the target value. However, if the maximum value of one segment is equal to the minimum value of the next segment, both segments must be opened; in like manner segments with equal minimum and maximum key values that match the target key value must be opened. That is, the target key value need only be compared to the metadata that identifies the range of each segment to identify which segment(s) needs to be searched. Similarly, if the target key value is a span of key values, the minimum and maximum of the span need only be compared with the metadata of the segments in each sorted run to identify the segment(s) that need to be searched.

In a preferred embodiment of this invention, the database is partitioned into a plurality of sorted runs, wherein the plurality includes progressively smaller sorted runs, the largest sorted run being substantially larger than the smallest sorted run. In an example embodiment, one of the sorted runs includes at least half of the records, and the other sorted runs are progressively smaller.

For example, as illustrated in FIG. 3, the largest sorted run 310 includes half of the records of the database, and each subsequent sorted run is half the size of the remaining sorted runs. That is, in this example, sorted run 320 includes a quarter of the records, sorted run 330 includes an eight of the records, sorted run 340 includes a sixteenth of the records, and so on until a chosen minimum size remains. If the minimum size is one segment, this exponential reduction in size results in no more than $\log_2(s)$ sorted runs, where s is the total number of segments. Other exponents may be used; for example, with an exponent of 8, the largest sorted run may include 7/8 of the N records in the database (i.e. (M−1)*N/M), and each subsequent sorted run is 7/8 the size of the remaining sorted runs (i.e. 7N/64, 7N/512, etc.), resulting in $\log_8(s)$ sorted runs. The choice of exponent is a tradeoff between the expected speed of data ingestion and the expected speed of searches, a higher exponent providing faster searching by reducing the number of sorted lists. The dynamic nature of the data will also affect the choice of exponent, rapidly changing data favoring a lower exponent.

Although the aforementioned example has an algorithmically determined distribution of sizes, such a determination is merely a convenience for calculating expected performance, for determining when to merge subsequent sorted runs to reduce the number of sorted runs, for determining the aforementioned tradeoff between the speeds of data ingestion and searching, and so on. As will be evident in the subsequent paragraphs, large sorted runs facilitate rapid searching, and smaller sorted runs facilitate the sorted merging of ingested data. Preferably, the largest sorted run should be substantially larger than the smallest sorted run, with a variety of sizes of intermediate sized sorted runs to provide substantially consistent performance between the extremes of fast data ingestion (small sorted runs) and fast searches (large sorted runs).

Figure 4:
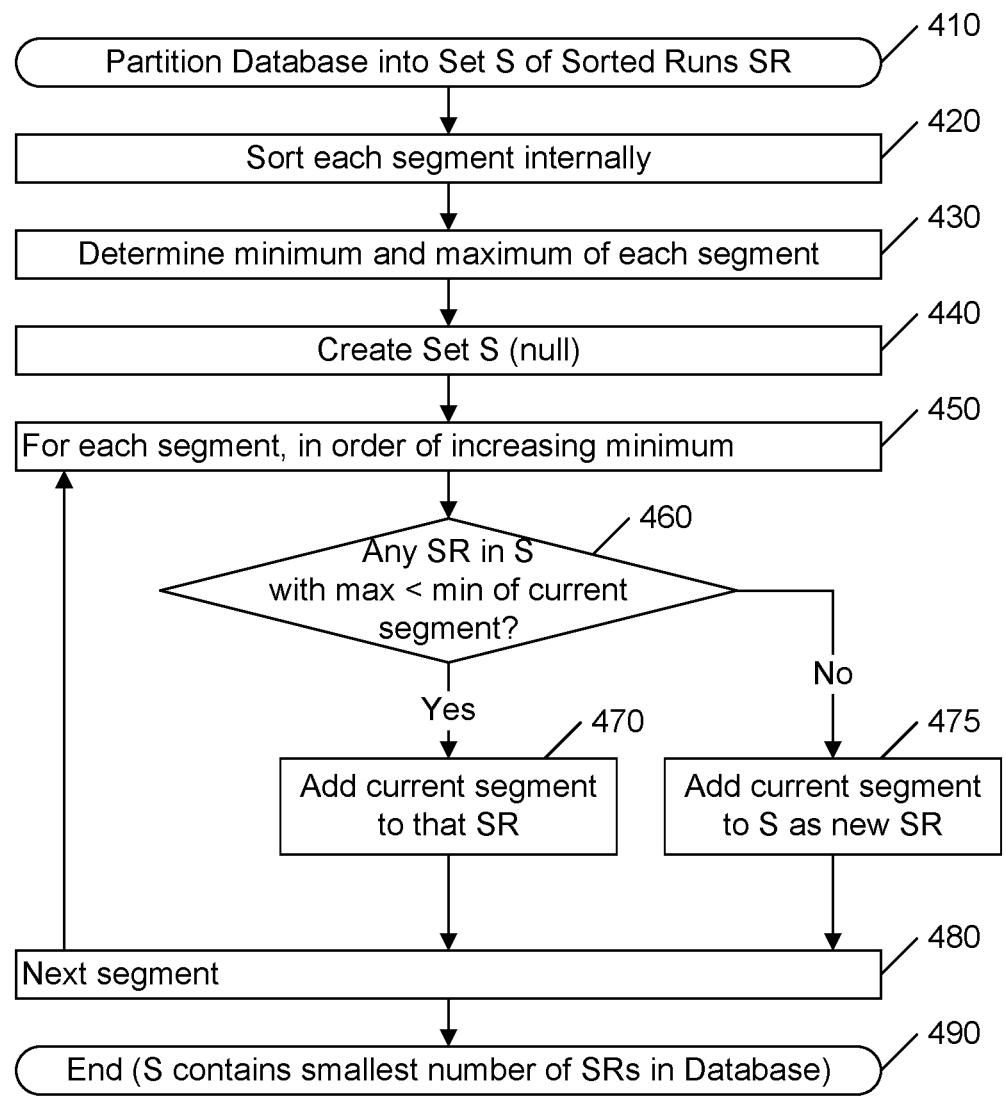
FIG. 4 illustrates an example flow diagram for partitioning a database into a set of sorted runs.

FIG. 4 illustrates an example flowchart for partitioning a database into a smallest number of sorted runs. As noted above, each search requires searching each of the sorted runs, and a reduction in the number of sorted runs results in a reduction of time to search, particularly if the search is for a sorted key value. For example, a sorted search is typically of the order log(n), where n is the number of elements in the search. Two searches through half the search space is of the order 2*log(n/2), which can be substantially greater than log(n), particularly for large n.

The process of creating a set S of sorted runs SRs begins at 410. Initially, each segment is sorted, at 420, and the minimum and maximum key values are determined, at 430. The set S is initialized to a null set, at 440. The loop 450-480 processes each segment, in the order of increasing minimum key values. Effectively, each segment is assessed to determine whether it can be added to an existing sorted run SR in the set S, based on the minimum key value in the segment and the maximum key value in the sorted run SR, at 460. If there is, the segment is added to that sorted run, at 470. If not, the current segment is added as another sorted run SR in the set S, at 475. This process ensures that the smallest number of SRs in the database.

If the distribution of sizes of the resultant sorted runs SRs in the set S is determined to be suitable (e.g. at least one very large sorted run, and a suitable variety of smaller sizes), this set S can be used directly for providing rapid searches and rapid data ingestion.

Figure 5:
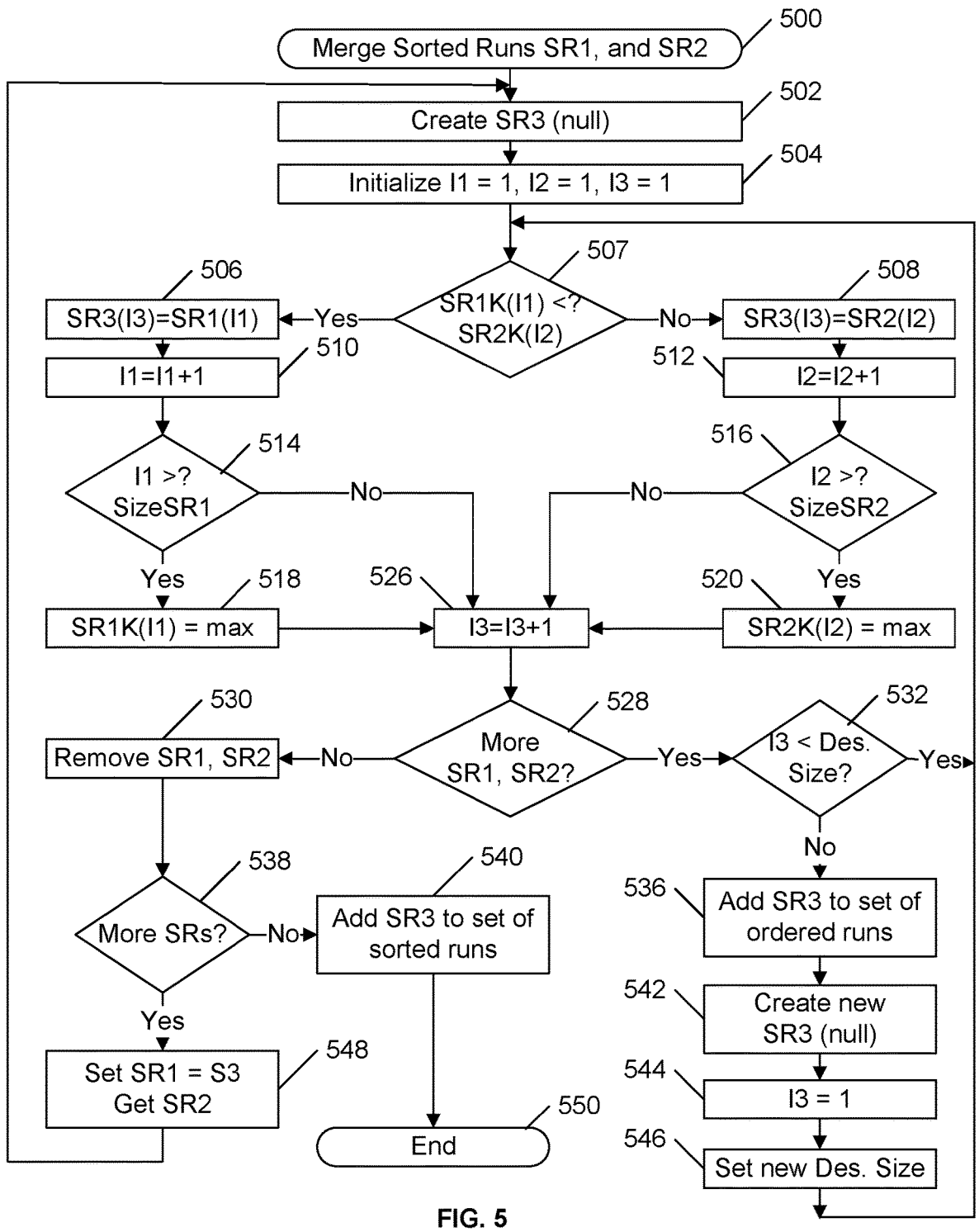
FIG. 5 illustrates an example flow diagram for merging sorted runs.

If, on the other hand, the distribution of sizes doesn't provide a very large sorted run, or many similarly sized sorted runs, multiple sorted runs may be merged into a larger sorted run. FIG. 5 illustrates a process that performs a sorted merge of two sorted runs SR1 and SR2 to create a sorted merge SR3. One of skill in the art will recognize that more than two sorted runs may be merged during this process, but for ease of presentation and understanding, a merge of two segments is illustrated. Since the size of each sorted run is known, and the size of the desired larger sorted run is known, the appropriate set of sorted runs can be selected and merged in a single process.

The process for merging sorted runs SR1 and SR2 starts at 500. A null sorted run SR3 is created, at 502, and the indices I1, I2, I3 to the records of each sorted run SR1, SR2, and SR3 are initialized to point to the first record of each sorted run (i.e. I1 and I2 point to the minimum key value in each sorted run SR1, SR2, and to a next-to-be-added record in SR3), at 504.

At 507, the key values SR1K(I1), SR2K(I2) of the indexed record in each sorted run are compared. If the key value SR1K(I1) is smaller than the key value SR2K(I2), this record SR1(I1) is added to the merged sorted run SR3 as the next-to-be-added record SR3(I3), at 506. Otherwise, the record SR2(I2) from the other sorted run SR2 is added as the next-to-be-added record SR3(I3), at 508. That is, the record having the smaller key value is added to SR3; if more than two sorted runs are being merged, the record among these sorted runs having the smallest key value is added to SR3.

Having added a record from SR1 or SR2 to SR3, the index to the corresponding sorted run SR1 or SR2 is incremented, at 510 or 512. If the index I1 or I2 points beyond the last record in the sorted run SR1 or SR2, at 514 or 516, then the remainder of the other sorted run SR2 or SR1 can be added to SR3. In the example of FIG. 5, this is accomplished by setting an 'imaginary' key value at the index beyond the last record to a maximum value that will be known to be greater than the remaining key values in the other sorted run, at 518 or 520. Having added the lower key value record to SR3, the next-to-be-added index I3 is incremented, at 526.

If, at 528, there are records remaining to be merged in either SR1 or SR2, the system loops back to processing them, at 507, after determining whether the size of SR3 has achieved the desired size, at 532. If it has reached the desired size, SR3 is added to the set of sorted runs and another null sorted run SR3 is created, at 542, and its index I3 is initialized, at 544. Having created a sorted run at the desired size, the next smaller desired size is defined, at 546. In the example exponential decrease in size, the next smaller desired size is the prior desired size divided by the selected exponent.

If, at 528, there are no records remaining to be merged in either SR1 or SR2, SR1 and SR2 are removed from the set of sorted runs of the database, at 530. At 538, it is determined whether any other sorted runs remain to be merged. If so, at 548, the current merged sorted run S3 is defined as a sorted run to be merged, S1, the other sorted run that remains to be merged is defined as S2, and the process is repeated, at 502. Otherwise, with no further sorted runs to be merged, the merged sorted run SR3 is added to the set of sorted runs, and the merge process ends, at 550.

With the database being partitioned into a plurality of sorted runs with at least one very large sorted run, read, write, modify, and delete functions may be executed, as detailed further below.

To execute a delete, a 'delete map' is maintained that identifies which records, in which sorted lists, have been deleted, thereby 'marking' these records as being deleted. During subsequent operations, as each sorted run is being processed, the records that are marked as being deleted are ignored.

Figure 6:
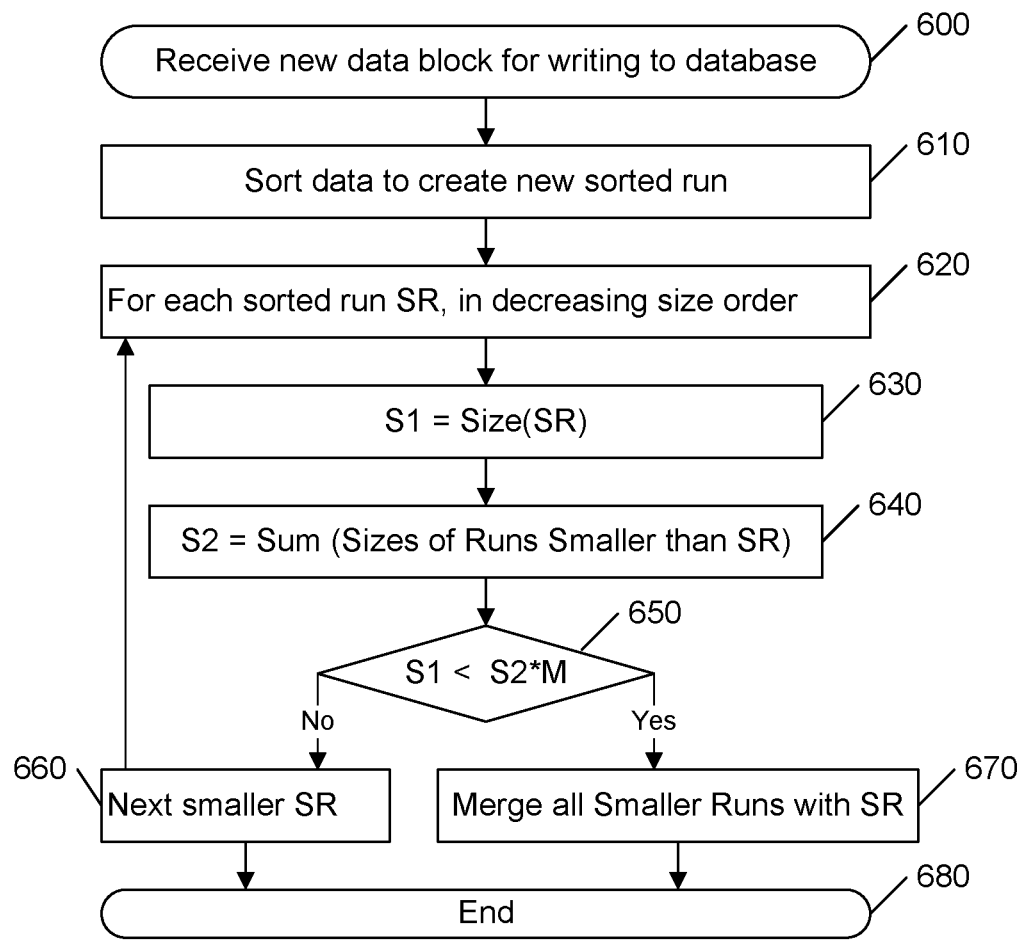
FIG. 6 illustrates an example flow diagram for writing a data block to the database.

FIG. 6 illustrates an example flow diagram for writing a data block to the database, at 600. Depending upon the particular database and related applications, the data block may range from one segment to hundreds or thousands of segments.

At 610, the data block to be added is sorted to create a new sorted run that is added to the list of sorted runs. The process for creating a sorted run may follow the processes defined above, wherein sorted runs are defined using internally sorted segments (FIG. 4), then merging these sorted runs (FIG. 5, but without the checks for a desired size). Optionally, depending upon the number and sizes of the sorted runs, this merging may be omitted, and each sorted run in the data block is added to the database independently (using this same process for each).

The sizes of the sorted run are compared to determine whether one or more runs should be merged. The process determines when the distribution of the sizes of the sorted runs necessitates a redistribution of the records among a new set of sorted runs to maintain the desired distribution of sizes of the sorted runs. In the example of FIG. 6, an exponential size distribution is assumed to be used, with an exponent M. With a desired exponential distribution with exponent M, each sorted run should ideally be M times larger, or more, than the remaining (smaller sized) sorted runs.

The redistribution process is performed beginning with the largest sized sorted order, and continuing to assess the sorted runs in decreasing order of size, at 620. At 630, the size of the current sorted run (SR) is determined (S1), and at 640, the sum of all the sizes of the sorted runs that are smaller than the current run (SR) is determined (S2). At 650, the size of the current sorted run (SR) is compared to M times the sum of sizes of the smaller sorted runs (M*S2).

If, at 650, the smaller runs have grown, or the size of the current sorted run (SR) has been decreased by deletions, such that the current sorted run (SR) is smaller than M times the sum of their sizes, a merged sort (FIG. 5, with a desired size, at 532, equal to the total size of all of the sorted runs being merged) is performed to merge all of the smaller sized sorted runs with the current sorted run, at 670. This will replace the (under-sized) current sorted run (SR) and the smaller sized sorted runs with a single sorted run. Thereafter, the process ends, at 680.

If, at 650, the current sorted run (SR) remains larger (or equal) than M times the sum of the sizes of the smaller sorted runs, the next smaller sorted run is assessed in the loop 620-660. After assessing all of the sorted runs, or after merging the smaller runs into a detected mis-sized sorted run, the process ends, at 680.

One of skill in the art will recognize that other criteria may be used to determine whether to add the merged sorted run to the set of sorted runs comprising the database, the objective being to avoid similarly sized sorted lists. The merge criteria may also be dynamic. For example, the time required to effect each merge may be determined and the decision to merge sorted runs instead of merely adding the sorted run to the set of sorted runs may be dependent upon the current load, and/or the type of load, being experienced. For example, if reads are experiencing excessive delays, the merge may be performed, while if writes are being delayed the merge may be postponed. If the load is light, the merge may always be performed, if only to effect the aforementioned garbage collection provided by the merge process.

Conventionally, to avoid potential conflicts, only one merge may be performed at any given time. However, a substantial amount of time may be consumed when large sorted runs are being merged, and mergers of small sorted runs, as is typical with ongoing writes, are queued during this time. This queuing results in periods of slow data ingestion followed by bursts of fast data ingestion as the small merges in the queue are quickly processed after the large merge is completed. In a preferred embodiment, each sorted run is categorized as being 'large' or 'small', and two independent merge processes are supported. One of the merge processes ('large merge sort') is used exclusively with 'large' sorted runs, while the other ('small merge sort') is used with 'small' sorted runs.

Figure 7:
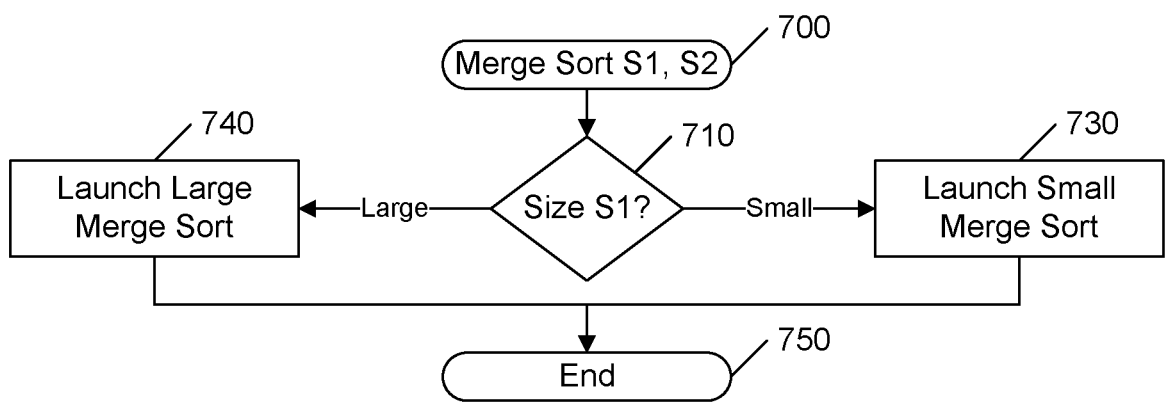
FIG. 7 illustrates an example flow diagram for using concurrent merge sorts.

FIG. 7 illustrates the selective execution of these independent merges, at 700. At 710, the size of the sorted runs is assessed. Merges of small sorted runs are routed to the small merger sort, at 730, while merges of large sorted runs are routed to the large merge sort, at 740. In this embodiment, to avoid conflicts, it is assumed that both sorted runs have the same size characterization. This can be effected, for example, by changing the characterization of any sorted run as 'large' when it is being merged with a 'large' sorted run. That is, the sorted run at the boundary of large and small may initially be characterized as 'small' until its size triggers a merge with its next larger sorted run, at which time it will be re-characterized as 'large', provided that it is not already included in a scheduled merge as a 'small' sorted run. Because the characteristic is only one value or the other, there is no possibility of the same sorted run being submitted to both merge processes concurrently. With this arrangement, data ingestion of relatively small sorted runs are processed quickly, without being delayed by the merging of large sorted runs that generally improve the efficiency of data searches.

Figure 8:
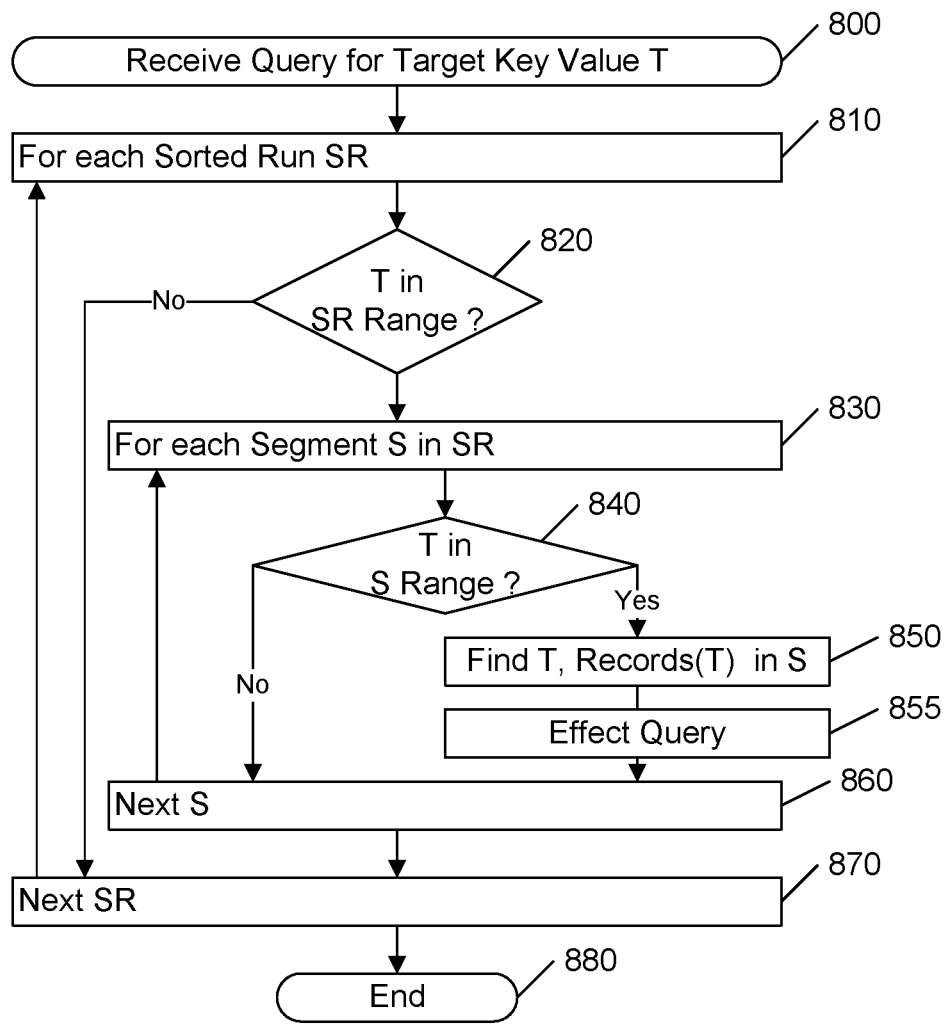
FIG. 8 illustrates an example flow diagram for responding to a query.

FIG. 8 illustrates an example flow diagram of a search process in response to a query for a target key value T in the database, at 800. As noted above, a search of the database is executed by searching each of the sorted runs SR of the database. The loop 810-870 executes the search within each sorted run SR. As with each segment, metadata may be associated with each sorted run, identifying the range (minimum:maximum) of the sorted run SR. At 820, this range is assessed to determine whether the target key value T is within the current SR's range. If not, there is no need to search this sorted run, and the next sorted run is addressed, at 870. If the target T is within the range of the current sorted run SR, each segment S in the sorted run SR is assessed, via loop 830-860, to determine whether the target T is within the range of the segment S based on the metadata that defines the range of segment S. If the range of segment S does not encompass target key value T, the next segment S is addressed, at 860. If the range of segment S includes the target key value T, the records in the 'target' segment S are searched to find the record(s) with a key attribute that matches the target key value T (or return a null value if no records are found with a matching key attribute). Because the target segment S is sorted with respect to the key attribute value, this search is significantly faster than a search of an unsorted set of records.

At 855, upon finding the record(s) having key values matching the target key value T, the identified record will be processed based on the particular query. For example, if the query is for a count of records having this target key value the corresponding counter is incremented, without further access to the record. On the other hand, if particular attribute values are needed to respond to the query, the record with the matching key is accessed to provide these values.

One of skill in the art will recognize that this same process may be executed to search for a span of target values T1:T2. In such an embodiment, the decision blocks 820 and 840 are reworded as "any T in T1:T2 in (SR or S) range".

Figure 9:
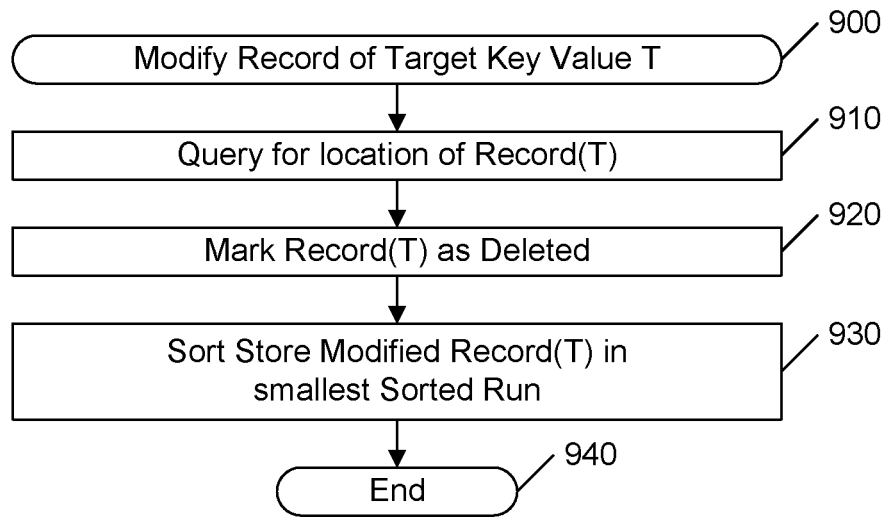
FIG. 9 illustrates an example flow diagram for modifying a record of the database.

FIG. 9 illustrates an example process for modifying a record having a target key value T, at 900. Because it is unknown whether the modification may affect an attribute that is used as a key attribute in another projection, a matching record is replaced in its entirety by a new record. At 910, the sorted runs are searched for key values matching the target key T, using, for example, the process of FIG. 8. Upon finding the record with matching key T, the record is marked as deleted, at 920, using, for example, the aforementioned deletion map. At 930, the modified record is written to the database, using, for example, an insertion sort into the smallest sorted run. Alternatively, a separate write buffer may be maintained to collect such additions, with regular batch-writes to the database using the process of FIG. 5. This write buffer may be a sorted run that is specifically structured to facilitate sorted insertions, and would be included as an additional sorted run that is included in subsequent database searches.

As detailed above, the techniques of this invention satisfy the requirement for both rapid data ingestion and rapid search response. Of particular note, the availability of a very large sorted run facilitates rapid search responses, whereas the availability of substantially smaller sorted runs facilitates rapid sorted data ingestion. A variety of sizes of sorted runs provides a continuity of response that serves to provide a balance between rapid search response and rapid data ingestion.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the system may enable a user to execute merges directly. This may be performed, for example, when the user notices that the database is growing substantially due to the retention of deleted records. In like manner, the system may enable a user to merge all sorted runs to remove all deleted records. In this case, the system may effect the merge of FIG. 5, with or without the segregation into a plurality of sorted runs based on different desired sizes. This may be performed without the segregation into the plurality of sorted runs during a period of little or no activity, to create a single sorted run for optimal search efficiency. Subsequent writes to the database will create the smaller sorted runs to return the system to one of a variety of sizes between the largest and smallest sorted runs. These and other system configuration and optimization features will be evident to one of ordinary skill in the art in view of this disclosure, and are included within the scope of the following claims.

In interpreting these claims, it should be understood that:
 a) the word "comprising" does not exclude the presence of other elements or acts than those listed in a given claim;
 b) the word "a" or "an" preceding an element does not exclude the presence of a plurality of such elements;
 c) any reference signs in the claims do not limit their scope;
 d) several "means" may be represented by the same item or hardware or software implemented structure or function;
 e) each of the disclosed elements may be comprised of a combination of hardware portions (e.g., including discrete and integrated electronic circuitry) and software portions (e.g., computer programming).
 f) hardware portions may include a processor, and software portions may be stored on a non-transitory computer-readable medium, and may be configured to cause the processor to perform some or all of the functions of one or more of the disclosed elements;
 g) hardware portions may be comprised of one or both of analog and digital portions;
 h) any of the disclosed devices or portions thereof may be combined together or separated into further portions unless specifically stated otherwise;
 i) no specific sequence of acts is intended to be required unless specifically indicated; and
 j) the term "plurality of" an element includes two or more of the claimed element, and does not imply any particular range of number of elements; that is, a plurality of elements can be as few as two elements, and can include an immeasurable number of elements.

We claim:
1. A non-transitory computer readable medium that includes a program that, when executed on a processing system, causes the processing system to:
 column store a database into a plurality of storage segments of a memory storage device, each storage segment comprising a plurality of data items from a column of the database, and the data items of each storage segment being sorted with respect to a key value and characterized by a minimum key value and a maximum key value that define a key range of the storage segment; and
 partition the plurality of storage segments of the memory storage device into a plurality of sorted runs each comprising one or more storage segments, wherein the key range of each storage segment in each sorted run does not overlap the key range of any other storage segment in the sorted run;
 receive data to be added to the database;
 create a further sorted run in the plurality of sorted runs that includes one or more storage segments of the memory storage device into which the data is column stored in sorted order with respect to the key value;
 merge the newly created sorted run with one of the plurality of sorted runs;
 wherein in response to a query for a target key value, the program causes the processor to:

identify each target storage segment that is to be searched based on the target key value and the key range of each storage segment in each sorted run;

search each of the target storage segments for the target key value; and provide a result to a user based on the search.

2. The medium of claim 1, wherein a largest sorted run of the plurality of sorted runs is larger than a smallest sorted run of the plurality of sorted runs, and the plurality of sorted runs includes other sorted runs of sizes between the smallest and the largest; and wherein the program causes the processor to merge two or more sorted runs to create a merged sorted run to replace the two or more sorted runs in the plurality of sorted runs depending on the distribution of the sizes of the sorted runs.

3. The medium of claim 2, wherein the largest sorted run includes at least half of the records of the database.

4. The medium of claim 2, wherein sizes of the sorted runs between the largest and smallest sorted runs decrease exponentially from the largest sorted run.

5. The medium of claim 4, wherein the exponential decrease is based on an exponent of at least four.

6. The medium of claim 2, wherein when a sorted run is determined to be less than a threshold size greater than all smaller sorted runs, said sorted run is merged with all smaller sorted runs.

7. The medium of claim 2, wherein the program causes the processor to concurrently maintain a first merge process that merges two or more sorted runs that are larger than a threshold size, and a second merge process that merges two or more sorted runs that are smaller than a threshold size.

8. The medium of claim 1, wherein upon receipt of a command to delete a record, the program causes the processor to mark the record as deleted, and to use this mark to ignore the record while responding to search queries.

9. The medium of claim 8, wherein in response to a command to modify a record, the program causes the processor to delete the record and add a modified record to the database.

10. The medium of claim 1, wherein, in response to a user command, the program causes the processor to recreate the plurality of sorted runs by removing deleted records from the storage segments.

11. The medium of claim 1, wherein, in response to a user command, the program causes the processor to create a single sorted run that contains all of the records of the database.

12. A method comprising:

column storing a column-based database into a plurality of storage segments of a memory storage device, each storage segment comprising a plurality of data items from a column of the database, and each storage segment being sorted with respect to a key value and characterized by a minimum key value and a maximum key value that define a key range of the storage segment; and partitioning the plurality of storage segments of the memory storage device into a plurality of sorted runs comprising one or more storage elements, wherein the key range of each storage segment in each sorted run does not overlap the key range of any other storage segment in the sorted run;

receiving data to be added to the database;

creating a further sorted run in the plurality of sorted runs that includes one or more storage segments of the memory storage device into which the data is column stored in sorted order with respect to the key value; and merging the newly created sorted runs with one of the plurality of sorted runs;

receiving a query for a target key value;

identifying each target storage segment that is to be searched based on the target key value and the key range of each storage segment in each sorted run;

searching each of the target storage segments for the target key value; and providing a result to a user based on the search.

13. The method of claim 12, wherein a largest sorted run of the plurality of sorted runs is larger than a smallest sorted run of the plurality of sorted runs, and the plurality of sorted runs includes other sorted runs of sizes between the smallest and the largest; and the method further comprising merging two or more sorted runs to create a merged sorted run to replace the two or more sorted runs in the plurality of sorted runs depending on the distribution of the sizes of the sorted runs.

14. The method of claim 13, wherein the largest sorted run includes at least half of the records of the database.

15. The method of claim 13, wherein sizes of the sorted runs between the largest and smallest sorted runs decrease exponentially from the largest sorted run.

16. The method of claim 15, wherein the exponential decrease is based on an exponent of at least four.

17. The method of claim 13, wherein when a sorted run is determined to be less than a threshold size greater than all smaller sorted runs, said sorted run is merged with all smaller sorted runs.

18. The method of claim 13, including concurrently maintaining a first merge process that merges two or more sorted runs that are larger than a threshold size, and a second merge process that merges two or more sorted runs that are smaller than a threshold size.

19. The method of claim 12, wherein the method includes, in response to a command to modify a record, deleting the record and adding a modified record to the database.

20. The method of claim 12, wherein, the method includes, in response to a user command, recreating the plurality of sorted runs by removing deleted records from the storage segments.

* * * * *